W. GREENLEAF.
VEHICLE CHOCK.
APPLICATION FILED NOV. 9, 1911.
1,019,785.
Patented Mar. 12, 1912.
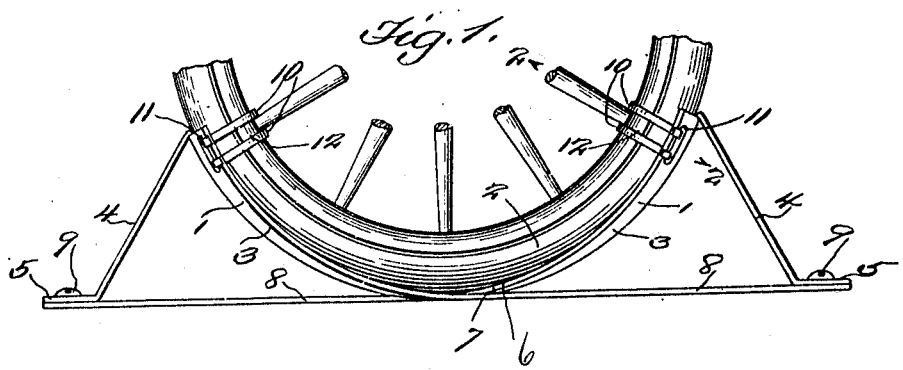
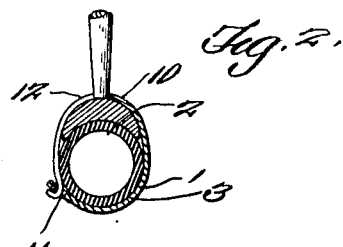
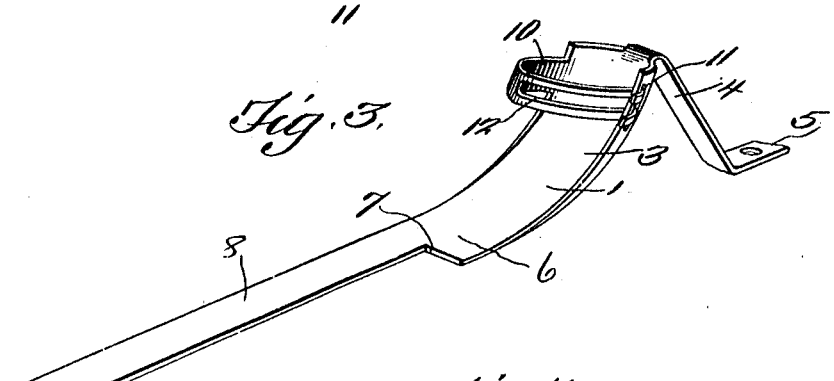
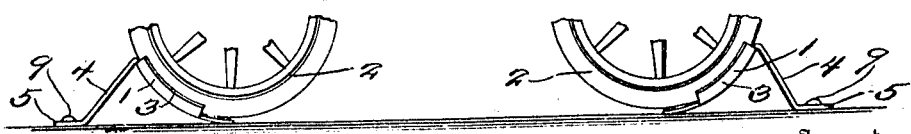
Inventor
William Greenleaf,
By D. Swift & Co.
Attorney
Witnesses
Francis T. Boswell
C. E. Firtingham

UNITED STATES PATENT OFFICE.

WILLIAM GREENLEAF, OF BAY CITY, MICHIGAN.

VEHICLE-CHOCK.

1,019,785.  Specification of Letters Patent.  Patented Mar. 12, 1912.

Application filed November 9, 1911. Serial No. 659,384.

*To all whom it may concern:*

Be it known that I, WILLIAM GREENLEAF, a citizen of the United States, residing at Bay City, in the county of Bay and State of Michigan, have invented a new and useful Vehicle-Chock; and I do hereby declare the following to be a full, clear, and exact description of the invention, such as will enable others skilled in the art to which it appertains to make and use the same.

This invention relates to a new and useful vehicle-chock or wheel support to hold the vehicle stationary while in transit on a ship or in a freight car.

The principal object of the invention is the provision of an improved vehicle-chock of this nature comprising simplicity and practicability and strength.

A further object of the invention is the production of a chock consisting of two members, adapted to fit and embrace firmly the front and rear of each wheel of the vehicle, thus holding the vehicle firmly and securely stationary, against the jars and the rocking movements of the conveyance on which the vehicle is arranged for transit.

The invention comprises further features and combination of parts, as hereinafter set forth, shown in the drawings and claimed.

In the drawings:—Figure 1 is a view in side elevation, showing the improved chock or wheel support constructed in accordance with the invention. Fig. 2 is a sectional view. Fig. 3 is a detail view of one of the chock members. Fig. 4 is a side elevation of the front and rear wheels of a vehicle showing a chock member adjusted in position in front of the front wheel and one in rear of the rear wheel.

Referring more particularly to the drawings 1 designate the chock members, each of which is constructed from one piece of sheet metal, a portion of which is curved to fit the annular contour of the wheel 2, as well as the transverse contour, as shown. These curved portions are designated by the characters 3. The upper portions of these curved portions are provided with extension brace arms 4, which are turned outwardly and downwardly and provided with feet 5. The lower adjacent portions 6 of the parts 3 are cut away as shown at 7, and are supplied with extension members 8, which underlap the curved portions 3 of each chock member. The extension members 8 are of sufficient length, to be fastened to the deck or the floor of a ship or freight car, and beneath the feet 5, by means for the screws, bolts or the like 9. When adjusting the chock members in position to fit and embrace the wheel, the extensions 8 may be pulled in opposite directions, while the braces 4 are pushed toward one another in direction of the wheel, thus causing the chock members to closely contact with the wheel. The curved portions 3 of the chock members are provided with integral straps 10, adapted to be passed about the tire and rim of a wheel, and passed through openings 11 of the curved portion 3, and then bent, thus insuring the wheel further against accidental displacement. These straps 10 are slotted to receive the spokes of the wheel. These slots are denoted by numerals 12.

In Fig. 4 the chock member is arranged to embrace each of the front and rear wheels, thus illustrating how a vehicle may be held against accidental movement in a store room, ware house or a garage.

From the foregoing it will be observed that, there has been devised a novel, efficient and simple vehicle chock, and one which has been found to be a great use and practical service.

The invention having been set forth, what is claimed as new and useful is:—

1. In combination, a pair of chock members, adapted to embrace the front and rear of a wheel, each member having a curved portion to embrace the annular and transverse curvatures of the wheel, the curved portions having extension members at their lower adjacent parts adapted to under lap the curved portions, the curved portions having their upper portions provided with braces having feet between which and the floor the extensions are secured after a pulling action has been imparted on the extensions to cause the curved portions to embrace the wheel.

2. In combination, a pair of chock members, adapted to embrace the front and rear of a wheel, each member having a curved portion to embrace the annular and transverse curvatures of the wheel, the curved portions having extension members at their lower adjacent parts adapted to underlap the curved portions, the curved portions having their upper portions provided with braces having feet between which and the floor the extensions are secured after a pulling action has been imparted on the extensions to cause the curved portions to embrace the wheel, the curved portions having straps provided with slots to receive the spokes of the wheel, the straps adapted to encircle the tire and the rim, and means for securing the straps in such positions.

In testimony whereof I have signed my name to this specification in the presence of two subscribing witnesses.

WILLIAM GREENLEAF.

Witnesses:
 JNO. C. HARRIS,
 E. C. COX.